(12) United States Patent
Nakajima et al.

(10) Patent No.: US 8,365,942 B2
(45) Date of Patent: Feb. 5, 2013

(54) WAVE ABSORBING STRUCTURE FOR FUEL TANK

(75) Inventors: Takeaki Nakajima, Wako (JP); Daisuke Nohara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 518 days.

(21) Appl. No.: 12/628,530

(22) Filed: Dec. 1, 2009

(65) Prior Publication Data

US 2010/0133283 A1 Jun. 3, 2010

(30) Foreign Application Priority Data

Dec. 2, 2008 (JP) ................................. 2008-307079

(51) Int. Cl.
*B60P 3/24* (2006.01)
*B65D 88/12* (2006.01)

(52) U.S. Cl. ........................................ 220/563; 137/574

(58) Field of Classification Search .................. 220/563, 220/564; 137/574
See application file for complete search history.

(56) References Cited

U.S. PATENT DOCUMENTS

| | | | | |
|---|---|---|---|---|
| 4,013,190 A * | 3/1977 | Wiggins et al. | ............... | 220/501 |
| 4,974,743 A | 12/1990 | Sasaki et al. | | |
| 6,032,347 A * | 3/2000 | Behr et al. | ................... | 29/419.1 |
| 6,408,979 B1 * | 6/2002 | Forbes et al. | ................. | 181/198 |
| 2003/0015537 A1 * | 1/2003 | Konja | ............................. | 220/563 |
| 2004/0134916 A1 * | 7/2004 | Bambacigno | ................. | 220/563 |
| 2004/0159663 A1 * | 8/2004 | Fenton | .......................... | 220/563 |
| 2009/0078705 A1 * | 3/2009 | Ramsay | ........................ | 220/562 |
| 2011/0017748 A1 * | 1/2011 | Palma et al. | .................. | 220/562 |
| 2011/0186582 A1 * | 8/2011 | Whitaker et al. | ............ | 220/563 |

FOREIGN PATENT DOCUMENTS

| | | |
|---|---|---|
| JP | 1-132423 U | 9/1989 |
| JP | 2004-232513 | 8/2004 |
| JP | 2004-322996 | 11/2004 |
| JP | 2005-335436 | 12/2005 |
| JP | 2007-237843 | 9/2007 |
| JP | 2008-265383 | 11/2008 |

* cited by examiner

*Primary Examiner* — Mickey Yu
*Assistant Examiner* — Niki Eloshway
(74) *Attorney, Agent, or Firm* — Rankin, Hill & Clark LLP (57) ABSTRACT

A wave absorbing member including a cage-shaped container housing a sponge that imparts resistance to the passing of fuel is arranged inside a tank body. Therefore, an impact by collision of the fuel can be absorbed, noise caused by undulation of the fuel can be reduced, and violent undulation of a fuel level can be effectively suppressed by the wave absorbing member. The wave absorbing member is supported by a pipe that is arranged inside the tank body and passes through a through hole formed in the container. A movement restricting member is provided on the pipe to limit movement of the wave absorbing member along the pipe. Therefore, the wave absorbing member is reliably positioned along the pipe and within the tank body with a simple structure.

20 Claims, 8 Drawing Sheets

WAVE ABSORBING STRUCTURE FOR FUEL TANK

BACKGROUND OF THE INVENTION

1. Field of the Invention

The present invention relates to a wave absorbing structure for a fuel tank that is arranged inside a fuel tank body, the wave absorbing structure including a wave absorbing member having a resistance member through which fuel can pass and which imparts resistance to the passage of the fuel.

2. Description of the Related Art

Japanese Patent Application Laid-open No. 2005-335436 discloses a technique in which the inside of a tank body formed by blow molding of a synthetic resin is sectioned into a first compartment and a second compartment by a narrow path, thereby allowing the path to exert a wave absorbing effect similar to a baffle plate.

In the technique disclosed in the JP 2005-335436 publication, however, the path is integrally formed inside the tank body. Thus, the tank body has a low degree of design freedom, and it is difficult to provide a wave absorbing effect in an existing tank body wherein the path is not provided.

To solve the problems, a wave absorbing structure for a fuel tank has been proposed in which a wave absorbing member including a cage-shaped container having a porous member for imparting resistance to passage of fuel is housed is arranged inside a tank body, and the wave absorbing member is supported by a pipe arranged inside the tank body that passes through a through hole formed in the container. Such a wave absorbing structure is disclosed in Japanese Patent Application No. 2008-175537.

The structure proposed in Japanese Patent Application No. 2008-175537 has a problem that since the pipe arranged inside the tank body passes through the through hole formed in the container of the wave absorbing member, the wave absorbing member moves along the pipe and is thus difficult to position.

Therefore, there exists a need in the art for a wave absorbing structure that has a simple structure and that may be reliably positioned along a pipe arranged inside the tank body.

SUMMARY OF THE INVENTION

The present invention has been accomplished in light of such circumstances, and it is an object thereof to provide a simple structure to reliably position a wave absorbing member relative to a pipe arranged inside a tank body.

In accordance with the present invention, a wave absorbing structure for a fuel tank includes a wave absorbing member having a resistance member through which fuel can pass and which imparts resistance to the passage of the fuel. Within the tank body, the wave absorbing member is supported by a pipe that is arranged inside the tank body and passes through a through hole formed in the wave absorbing member. A movement restricting member for restricting movement of the wave absorbing member by abutting against a wall surrounding an opening portion of the through hole is also provided.

The wave absorbing member having the resistance member that resists the passage of fuel is arranged inside the tank body. Therefore, the wave absorbing member can absorb an impact by collision of the fuel, reduce noise caused by undulation of the fuel, and effectively suppress violent oscillation of the fuel level. The pipe is arranged inside the tank body and extends through the through hole formed in the wave absorbing member and thereby supports the wave absorbing member. The movement restricting member is arranged on the pipe and is brought into abutment with the wall surrounding the opening portion of the through hole. Accordingly, the wave absorbing member is prevented from moving along the pipe.

In accordance with another aspect of the present invention, the wave absorbing member includes a cage-shaped container for housing the resistance member. Therefore, the resistance member, which may be a porous member, can be easily and reliably supported by the cage-shaped container.

In further accordance with another aspect of the present invention, the pipe has a smooth portion located inside the wave absorbing member, and a bellows portion formed to have a larger diameter than that of the smooth portion and exposed outside the wave absorbing member. The bellows portion serves as the movement restricting member that prevents movement of the wave absorbing member. As such, movement of the wave absorbing member can be reliably restricted with a simple and inexpensive structure. Moreover, the bellows portion allows the pipe shape to be changed to any shape, so that the degree of layout freedom inside the tank body can be increased.

In accordance with an alternative movement restricting member of the present invention, the pipe includes a flange portion expanded in diameter by bulge forming, the flange portion serving as the movement restricting member. Therefore, movement of the wave absorbing member can be reliably restricted with a simple and inexpensive structure.

In accordance with a further alternative movement restricting member of the present invention, there is provided the wave absorbing structure for a fuel tank, further comprising a collar fitted around an outer periphery of the pipe outside the wave absorbing member, the collar serving as the movement restricting member. Therefore, movement of the wave absorbing member can be reliably restricted with a simple and inexpensive structure.

In accordance with a still further alternative movement restricting member of the present invention, there is provided the wave absorbing structure for a fuel tank, further comprising a clip locked onto an outer periphery of the pipe, the clip serving as the movement restricting member. Therefore, movement of the wave absorbing member can be reliably restricted with a simple and inexpensive structure.

According to the present invention, the pipe is a fuel transfer pipe. Therefore, a special member for supporting the wave absorbing member is not required, and the number of components can be reduced.

The above description, other objects, characteristics and advantages of the present invention will be clear from detailed descriptions which will be provided for the preferred embodiment referring to the attached drawings.

DESCRIPTION OF THE PREFERRED EMBODIMENTS

Figure 1:
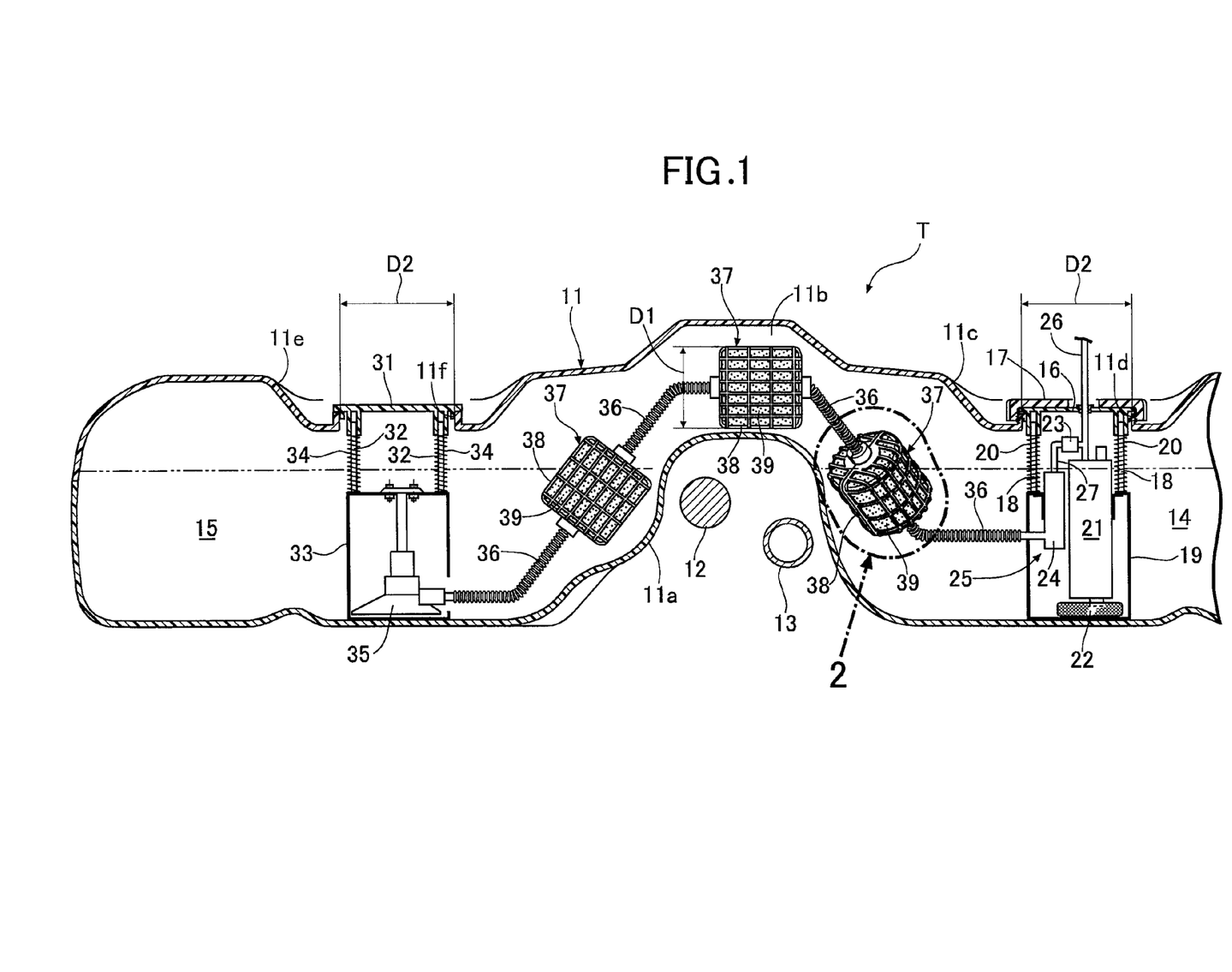
FIG. 1 is a longitudinal cross-sectional view of a vehicular fuel tank according to a first embodiment of the present invention.

Now embodiments of the present invention will be described below with reference to the attached drawings. Initially, it is noted that a fuel suction pipe 36 corresponds to a pipe of the present invention; a sponge 39 corresponds to a resistance member of the present invention; and a bellows portion 36a, a flange 36c, a collar 42 and a clip 43 correspond to a movement restricting member of the present invention. As shown in FIG. 1, a fuel tank T mounted on the bottom surface of a floor panel at a vehicle body rear portion of an automobile includes a tank body 11 formed by blow molding of a resin. A propeller shaft 12 for transmitting a driving force of an engine to rear wheels, and an exhaust pipe 13 for guiding an exhaust gas of the engine to the vehicle body rear portion are arranged in a groove-shaped concave portion 11a that extends in a front-and-rear direction through the center portion in the lateral direction of the bottom surface of the tank body 11. The tank body 11 is sectioned into a first tank compartment 14 on the right side and a second tank compartment 15 on the left side by the concave portion 11a. The first and second tank compartments 14 and 15 communicate with each other through a communicating portion 11b above the concave portion 11a.

A first opening 11d having a male thread on its outer periphery is formed in an upper wall 11c of the first tank compartment 14. A first lid body 16 for closing the first opening 11d is fixed while maintaining air tightness by a cap 17 having a female thread that is screwed with the male thread. A plurality of guide rods 18 are supported in a slidable manner in an up-and-down direction on the bottom surface of the first lid body 16. An upper portion of a first chamber 19 whose upper surface opens is fixed to the plurality of guide rods 18. The first chamber 19 is urged downward by resilient forces of coil springs 20 provided around the guide rods 18. A lower surface of the first chamber 19 abuts against an upper surface of a bottom wall of the first tank compartment 14.

A pump module 25 including a fuel pump 21, a suction filter 22, a pressure regulator 23 and a jet pump 24 is provided inside the first chamber 19. The fuel pump 21 supplies fuel, which is drawn or sucked through the suction filter 22 arranged at the bottom portion of the first chamber 19, to the engine through a fuel supply pipe 26. The fuel supply pipe 26 penetrates through the first lid body 16 and extends to the outside of the tank body 11. A fuel return pipe 27 branches away from the fuel supply pipe 26, and the pressure regulator 23 is provided in the fuel return pipe 27. The jet pump 24 is provided at a lower or tip end of the fuel return pipe 27. The pressure regulator 23 keeps the pressure of the fuel supplied to the engine at a constant level, and returns excess fuel to the inside of the first chamber 19 via the jet pump 24. The inside of first chamber 19 is thereby always filled with fuel.

On the other hand, a second opening 11f formed in an upper wall 11e of the second tank compartment 15 is closed by a second lid body 31 welded thereto by vibration welding or the like. A plurality of guide rods 32 are supported in a slidable manner in an up-and-down direction on a lower surface of the second lid body 31. An upper portion of a second chamber 33 is fixed to lower portions of the guide rods 32. The second chamber 33 is urged downward by resilient forces of coil springs 34 provided around the guide rods 32. A lower surface of the second chamber 33 abuts against an upper surface of a bottom wall of the second tank compartment 15. A flap or check valve (not shown), which allows fuel to flow into the second chamber 33 while preventing fuel from flowing out of the second chamber, is provided in the second chamber 33. The inside of the second chamber 33 is thereby always filled with fuel.

A fuel suction pipe 36 extends from a suction filter 35, which is arranged at the bottom portion of the second chamber 33, to the first tank compartment 14. The fuel suction pipe 36 extends through the communicating portion 11b between the first and second tank compartments 14, 15, and is connected to the jet pump 24 inside the first chamber 19.

Therefore, when the fuel pump 21 of the pump module 25 is operated during engine operation, fuel inside the first chamber 19 of the first tank compartment 14 is drawn or sucked up through the suction filter 22 and supplied to the engine via the fuel supply pipe 26. Excess fuel is returned to the first chamber 19 through the jet pump 24 and the pressure regulator 23 of the fuel return pipe 27. Fuel inside the second chamber 33 of the second tank compartment 15 is drawn or sucked up through the suction filter 35 by a negative pressure generated by the jet pump 24 and drawn into the first chamber 19 of the first tank compartment 14 through the fuel suction pipe 36 and the jet pump 24.

When the fuel level inside the tank body 11 is higher than the upper end of the concave portion 11a, the fuel levels in the first and second tank compartments 14 and 15 become equal to each other via the communicating portion 11b. Thus, the above-described suction of the fuel by the jet pump 24 is meaningless. However, when the fuel level inside the tank body 11 is lower than the upper end of the concave portion 11a, fuel inside the second tank compartment 15 cannot move to the first tank compartment 14 through the communicating portion 11b. Thus, only the fuel in the first tank compartment 14 is consumed with the fuel in the second tank compartment 15 not being consumed. Accordingly, the fuel level in the first tank compartment 14 may be reduced and the fuel supply to the engine may be stopped early.

However, since fuel in the second tank compartment 15 is supplied to the first tank compartment 14 by the jet pump 24, as described above, the fuel level in the second tank compartment 15 is always maintained at a high level, and the fuel in the tank body 11 can be used up to the end.

Three wave absorbing members 37 are provided on the fuel suction pipe 36. When the fuel level inside the tank body 11 violently undulates due to turning movement or oscillation of a vehicle, the wave absorbing members 37 function to stabilize the fuel level by suppressing the movement of the fuel.

Figure 2:
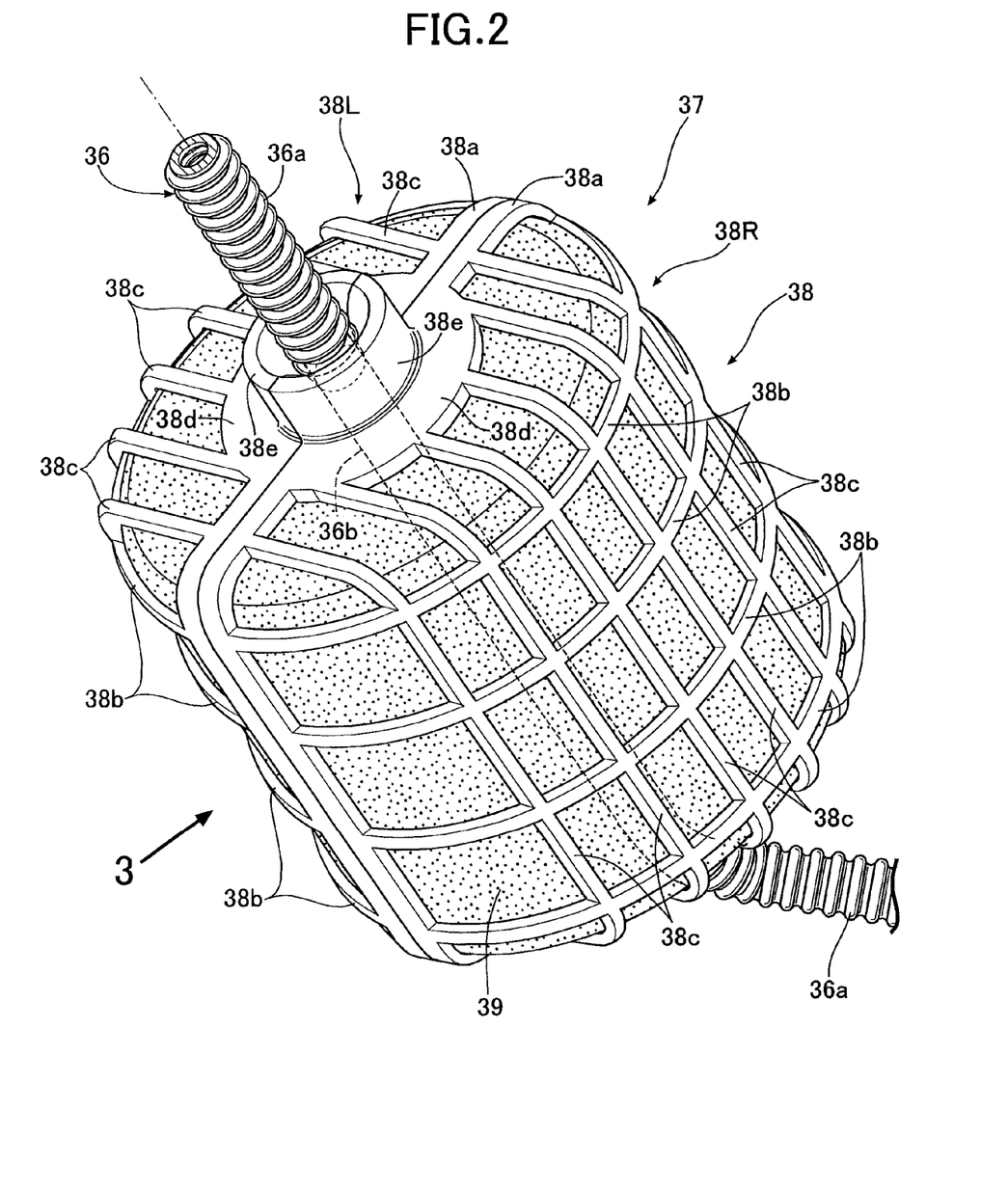
FIG. 2 is an enlarged view of part 2 in FIG. 1.
Figure 3:
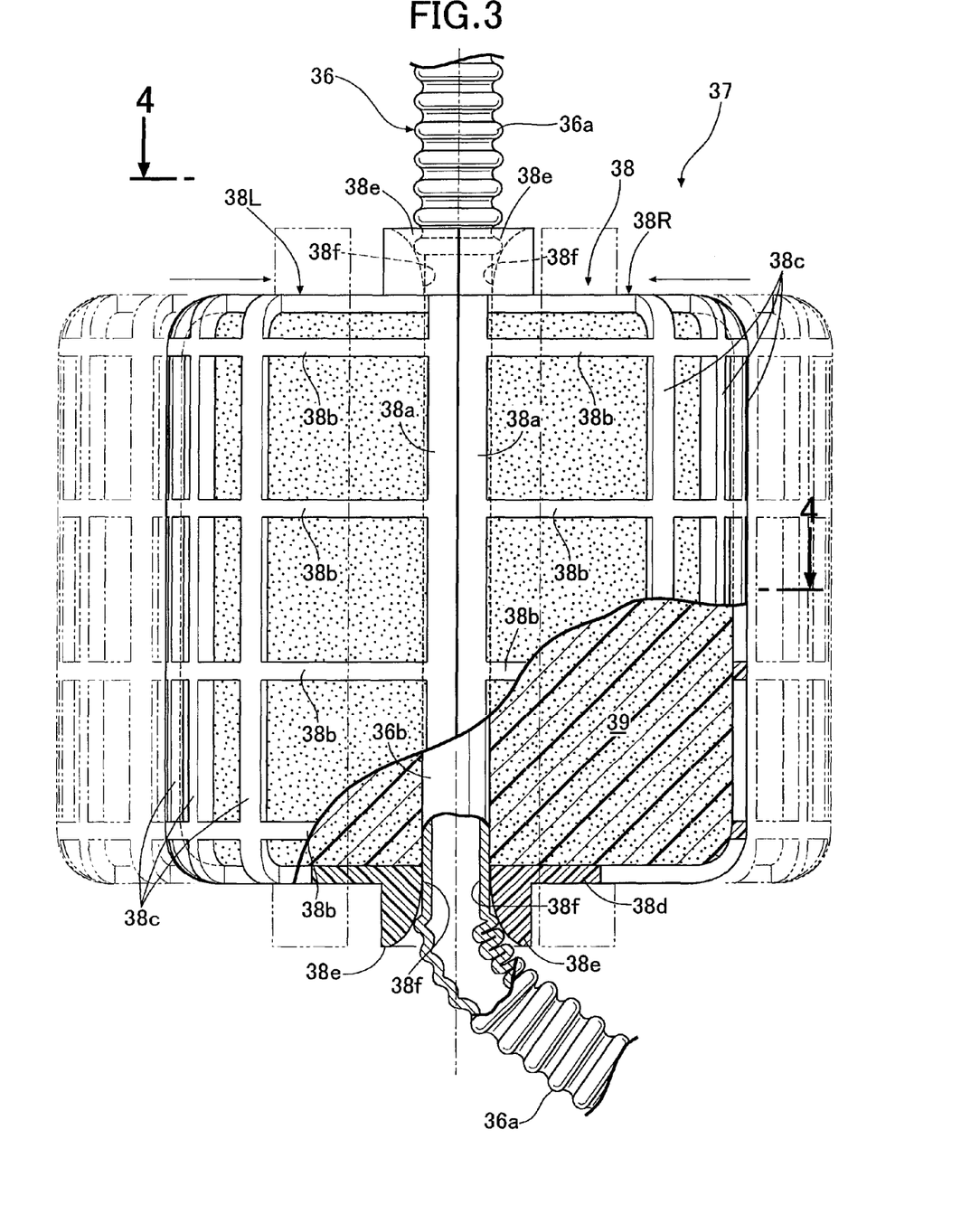
FIG. 3 a view from a direction of arrow 3 in FIG. 2.
Figure 4:
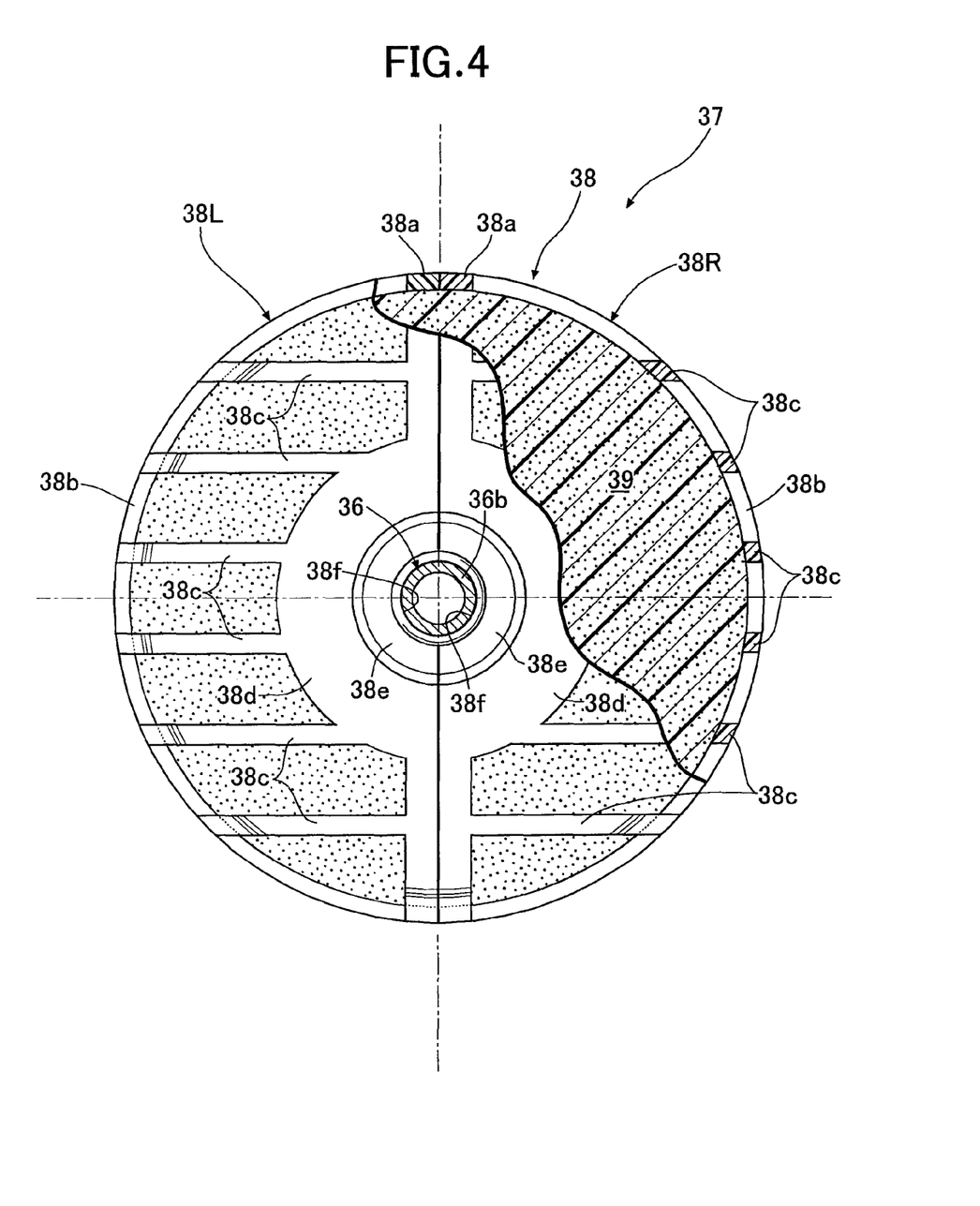
FIG. 4 is a cross-sectional view taken along line 4-4 in FIG. 3.

As shown in FIGS. 2 to 4, each of the wave absorbing members 37 includes a cage-shaped container 38 having a cylindrical shape. The container 38 is formed by first and second half bodies 38L and 38R, which are preferably identical to one another, and that are integrated by bonding or welding to form the cage-shaped container. For example, the first half body 38L includes a coupling rib 38a coupled to the second half body 38R and having a square frame shape, four arc-shaped lateral ribs 38b for connecting the coupling rib 38a in a peripheral direction, six square U-shaped vertical ribs 38c for connecting the coupling rib 38a in an axial direction, boss portions 38d provided at the opposite ends of the coupling rib 38a in the axial direction, and support portions 38e formed in the centers of the boss portions 38d such that the fuel suction pipe 36 can extend therethrough.

A sponge 39, which is a porous member having a large open space, is received or housed in the container 38. After the sponge 39 is disposed in the container 38, the first and second half bodies 38L and 38R of the container 38 are bonded or welded to each other at or along the coupling ribs 38a and 38a. A diameter D1 of the cylindrical container 38 is set to be smaller than a diameter D2 of each of the first and second openings 11d and 11f of the tank body 11 (see FIG. 1). Accordingly, the wave absorbing members 37 can be inserted into the tank body 11 through the first or second openings 11d and 11f, which are also used for inserting the pump module 25 or the suction filter 35. Therefore, the wave absorbing members do not require special openings to permit insertion of the wave absorbing members 37 into the tank body 11. Since the sponge 39 is housed in the container 38, the sponge 39, which has an unstable shape, can be easily and reliably supported.

The resin fuel suction pipe 36 includes a bellows portion 36a having a bellows-shaped pipe, and a smooth portion 36b having a simple smooth-sided pipe. The maximum outer diameter of the bellows portion 36a is larger than the outer diameter of the smooth portion 36b. The smooth portion 36b is received in the wave absorbing member 37. The opposite end portions of the smooth portion 36b are fitted into through holes 38f and 38f formed in the support portions 38e and 38e of the container 38. An intermediate portion of the smooth portion 36b extends through the sponge 39. The bellows portion 36a of the fuel suction pipe 36 is disposed outside the wave absorbing member 37. The end portions of the bellows portion 36a having a larger diameter than the smooth portion 36b abut against the wall surrounding the opening ends of the through holes 38f and 38f of the support portions 38e and 38e of the container 38.

The wave absorbing member 37 is thereby held on the outer periphery of the smooth portion 36b of the fuel suction pipe 36, and is prevented from moving along the fuel suction pipe 36 by engagement with the bellows portions 36a. Accordingly, the wave absorbing members 37 are held in position relative to one another and are reliably prevented from violently moving or colliding with each other inside the tank body 11.

Also, since the wave absorbing members 37 are supported by using the fuel suction pipe 36 provided inside the tank body 11, a special support member for supporting the wave absorbing members 37 is not required, so that the structure is simplified. Furthermore, since the bellows portions 36a of the fuel suction pipe 36 are freely bendable, a high degree of layout freedom of the fuel suction pipe 36 inside the tank body 11 is provided.

As will be appreciated by those skilled in the art, the wave absorbing member 37 can be assembled on or over the smooth portion 36b of the fuel suction pipe 36 by coupling the divided first and second half bodies 38L and 38R of the container 38 with the smooth portion 36b held therebetween. The bellows portions 36a serve as movement restricting members to limit movement of the wave absorbing member 37 along the fuel suction pipe 36.

Accordingly, due to the provision of the wave absorbing members 37 within the fuel tank body 11, even when the fuel level inside the tank body 11 violently undulates during operation of the vehicle, the movement of the fuel is suppressed by the wave absorbing members 37 to stabilize the fuel level and permit fuel to be stably supplied to the engine. Further, since the sponge 39 housed in the container 38 is a porous member, the sponge 39 does not completely block the passage of fuel. Any load experienced from the moving fuel is thereby reduced to prevent the fuel suction pipe 36 from being deformed. Furthermore, although the porous member (sponge 39) has an unstable shape, the porous member is housed in the cage-shaped container 38, thereby stabilizing the shape and avoiding interference with other members received within the fuel tank body 11.

Figure 5:
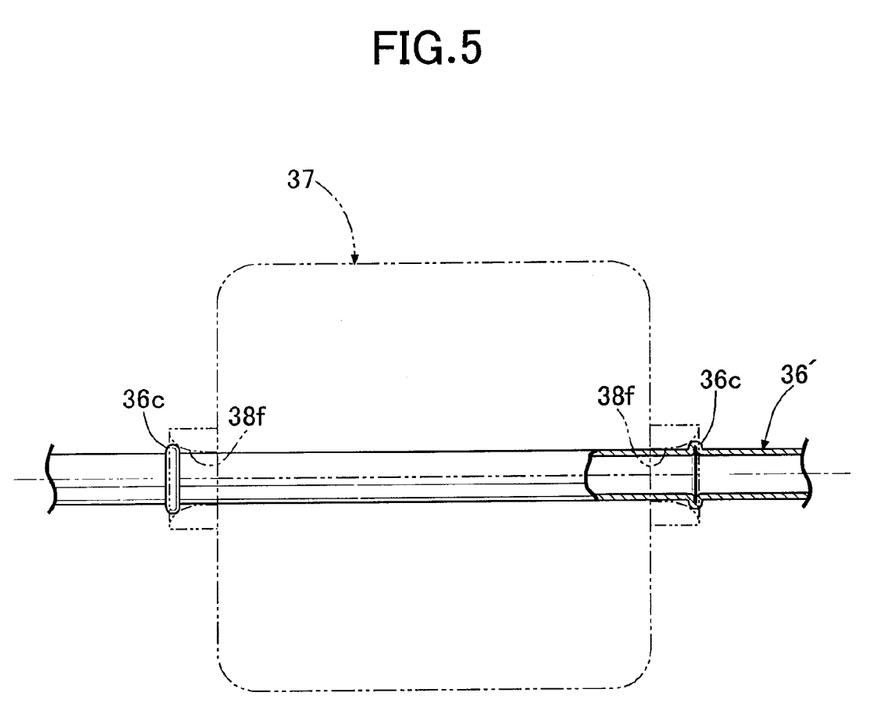
FIG. 5 is a view showing movement restricting means according to a second embodiment of the present invention.

A second embodiment of the present invention will be described with reference to FIG. 5, in which an alternative movement restricting member is provided.

A fuel suction pipe 36' according to the second embodiment is a pipe having a circular shape in section basically with a constant diameter. The fuel suction pipe 36' is expanded in diameter at appropriate positions by bulge forming to form flange portions 36c. When a wave absorbing member 37 is mounted on the fuel suction pipe 36', a pair of flange portions 36c and 36c of the fuel suction pipe 36' abuts against walls surrounding opening ends of through holes 38f and 38f of support portions 38e and 38e of a container 38, and thereby immovably hold the wave absorbing member 37 at a predetermined position on the fuel suction pipe 36'. The flange portions 36c, 36c serve as movement restricting members to limit movement of the wave absorbing member 37 along the fuel suction pipe 36'.

Figure 6:
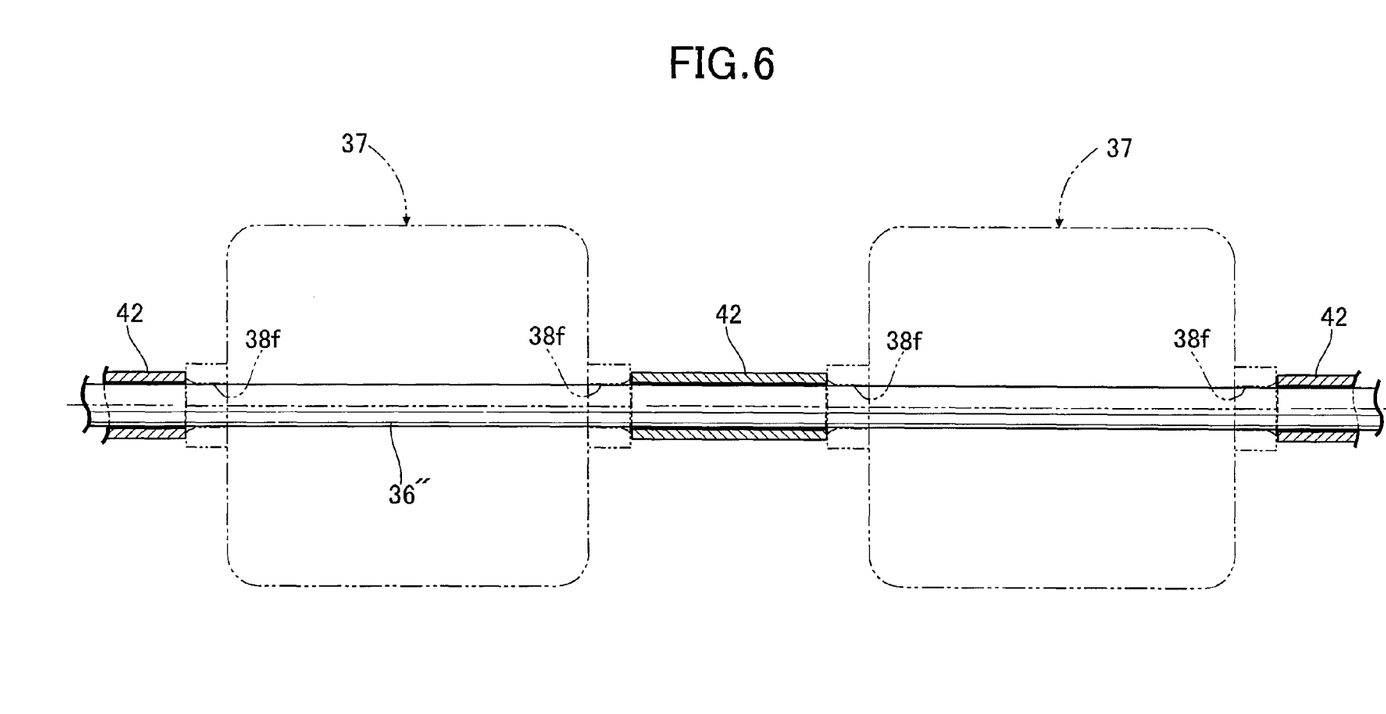
FIG. 6 is a view showing movement restricting means according to a third embodiment of the present invention.

A third embodiment of the present invention will be described with reference to FIG. 6, in which an alternative movement restricting member is provided.

The fuel suction pipe 36" according to the third embodiment is a pipe having a circular shape in section with a constant diameter. A plurality of collars 42 having a larger diameter than that of the fuel suction pipe 36" and a plurality of wave absorbing members 37 are alternately fitted around the outer periphery of the fuel suction pipe 36". The outer ends of the two collars 42 and 42 at the opposite ends of the fuel suction pipe 36" immovably abut against first and second chambers 19 and 33 (see FIG. 1), thereby immovably holding each of the wave absorbing members 37 at a predetermined position on the fuel suction pipe 36" via the collars 42 and 42 at the opposite ends.

Figure 7:
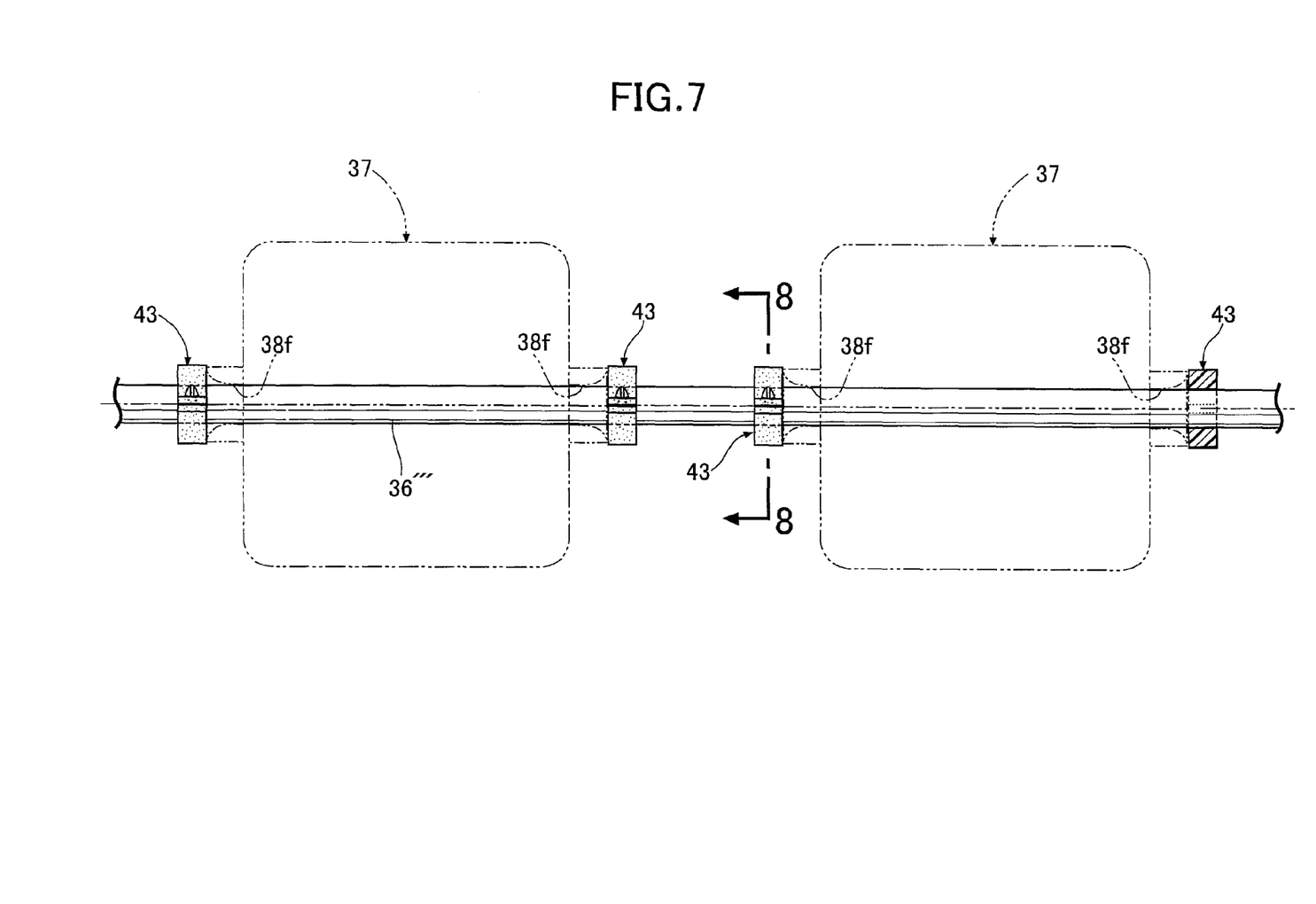
FIG. 7 is a view showing movement restricting means according to a fourth embodiment of the present invention; and, FIG. 8 is an enlarged cross-sectional view taken along a line 8-8 in FIG. 7.
Figure 8:
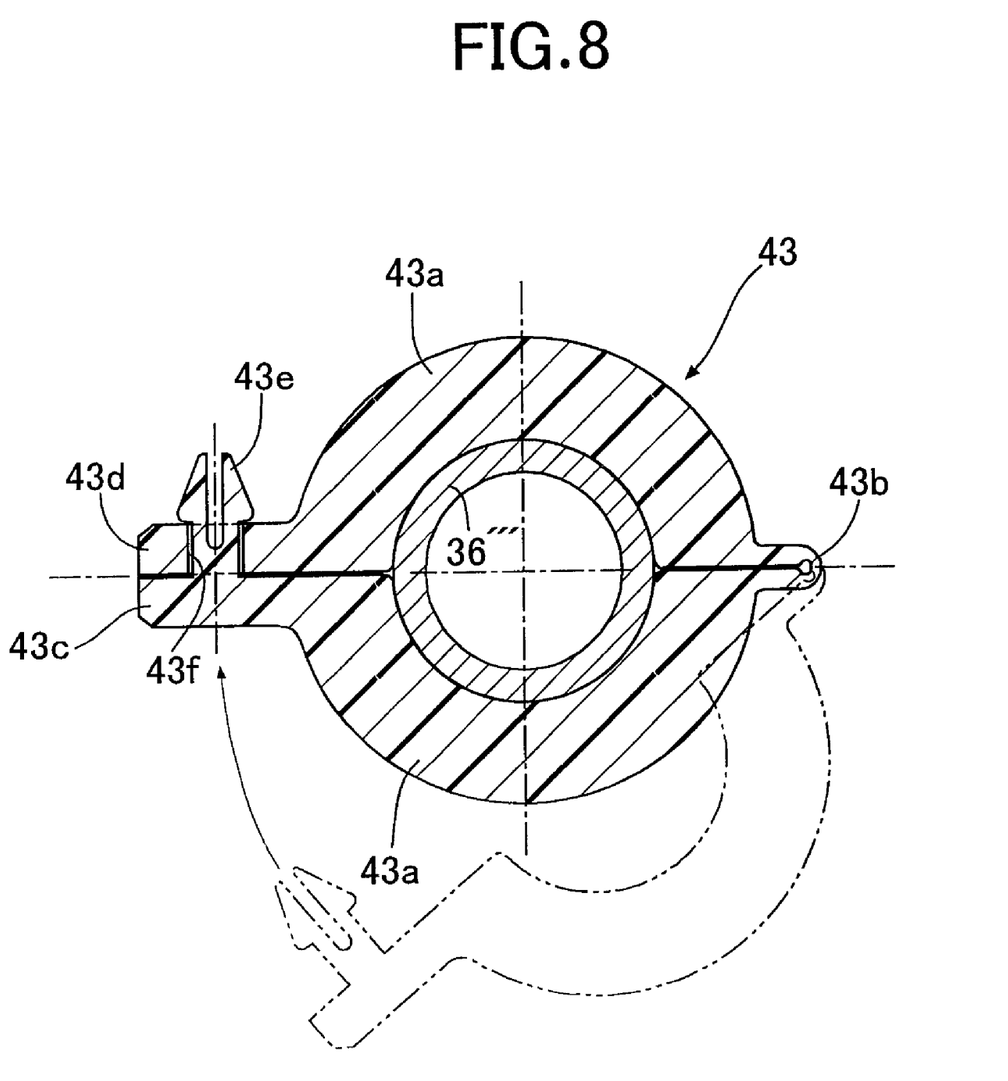

A fourth embodiment of the present invention will be described with reference to FIGS. 7 and 8, in which a further alternative movement restricting member is provided.

A fuel suction pipe 36''' according to the fourth embodiment is a pipe having a circular shape in section with a constant diameter. Removable clips 43 and 43 are mounted at appropriate positions on the fuel suction pipe 36'''. Each of the clips 43 bendably couples one end of a pair of arc-shaped body portions 43a and 43a by a hinge portion 43b. Each of the clips 43 also forms a locking projection 43e at one of coupling portions 43c and 43d provided on the other end of the body portions 43a and 43a and forms a locking hole 43f at the other of the coupling portions 43c and 43d. The locking projection 43e is fitted into the locking hole 43f with the pair of arc-shaped body portions 43a and 43a being positioned on the outer periphery of the fuel suction pipe 36'. The clips are thereby fixed to the fuel suction pipe 36. The clips 43 and 43 exert a similar function to that of the flange portions 36c and 36c according to the second embodiment, thereby immovably holding each of wave absorbing members 37 at a predetermined position on the fuel suction pipe 36'. As such, the clips 43, 43 limit movement of the wave absorbing members 37 along the fuel suction pipe 36'.

Accordingly, movement of the wave absorbing members 37 can be reliably restricted with a simple and inexpensive movement restricting members according to the first to fourth embodiments.

The embodiments of the present invention provide alternative movement restricting members, and are described above in detail, but various design changes may be made therein without departing from the scope of the present invention.

For example, although the fuel tank T in the embodiments includes the first and second tank compartments 14 and 15, the fuel tank T may include only a single tank compartment.

Also, in the embodiments, the resistance member (the sponge 39 in the embodiments) and the container 38 constitute the wave absorbing member 37. However, only the resistance member may constitute the wave absorbing member 37 by omitting the container 38. In this case, the through hole is formed in the resistance member itself.

What is claimed is:

1. A wave absorbing structure for a fuel tank, comprising:
 a wave absorbing member that is arranged inside a tank body of the fuel tank, said wave absorbing member including opposing walls and a resistance member, said resistance member being received between said opposing walls, said resistance member and the opposing walls cooperating to define a through hole, wherein the resistance member allows for passage of fuel while also imparting resistance to the passage of the fuel; and
 a pipe that is disposed inside the tank body, said pipe extending through the through hole formed in the wave absorbing member so as to support the wave absorbing member thereon, wherein the pipe includes a movement restricting member, said movement restricting member being disposed at a location adjacent an opening portion of the through hole in each of the opposing walls so as to restrict movement of the wave absorbing member along the pipe.

2. The wave absorbing structure for a fuel tank according to claim 1, wherein the wave absorbing member comprises the resistance member, and a cage-shaped container that receives the resistance member.

3. The wave absorbing structure for a fuel tank according to claim 2, wherein the pipe comprises a smooth portion located inside the wave absorbing member, and a bellows portion disposed outside the wave absorbing member, and wherein the bellows portion has a diameter that is larger than a diameter of the smooth portion, the bellows portion serving as the movement restricting member.

4. The wave absorbing structure for a fuel tank according to claim 3, wherein the pipe is fuel transferring pipe.

5. The wave absorbing structure for a fuel tank according to claim 2, wherein the pipe comprises a flange portion expanded in diameter by bulge forming, the flange portion serving as the movement restricting member.

6. The wave absorbing structure for a fuel tank according to claim 5, wherein the pipe is fuel transferring pipe.

7. The wave absorbing structure for a fuel tank according to claim 2, further comprising a collar fitted around an outer periphery of the pipe outside the wave absorbing member, the collar serving as the movement restricting member, wherein the pipe is fuel transferring pipe.

8. The wave absorbing structure for a fuel tank according to claim 2, further comprising a clip that is locked onto an outer surface of the pipe, the clip serving as the movement restricting member.

9. The wave absorbing structure for a fuel tank according to claim 8, wherein the pipe is fuel transferring pipe.

10. The wave absorbing structure for a fuel tank according to claim 2, wherein the pipe is fuel transferring pipe.

11. The wave absorbing structure for a fuel tank according to claim 1, wherein the pipe comprises a smooth portion located inside the wave absorbing member, and a bellows portion disposed outside the wave absorbing member, and wherein the bellows portion has a diameter that is larger than a diameter of the smooth portion, the bellows portion serving as the movement restricting member.

12. The wave absorbing structure for a fuel tank according to claim 11, wherein the pipe is fuel transferring pipe.

13. The wave absorbing structure for a fuel tank according to claim 1, wherein the pipe comprises a flange portion expanded in diameter by bulge forming, the flange portion serving as the movement restricting member.

14. The wave absorbing structure for a fuel tank according to claim 13, wherein the pipe is fuel transferring pipe.

15. The wave absorbing structure for a fuel tank according to claim 1, further comprising a collar fitted around an outer periphery of the pipe outside the wave absorbing member, the collar serving as the movement restricting member.

16. The wave absorbing structure for a fuel tank according to claim 15, wherein the pipe is fuel transferring pipe.

17. The wave absorbing structure for a fuel tank according to claim 1, further comprising a clip that is locked onto an outer surface of the pipe, the clip serving as the movement restricting member.

18. The wave absorbing structure for a fuel tank according to claim 17, wherein the pipe is fuel transferring pipe.

19. The wave absorbing structure for a fuel tank according to claim 1, wherein the pipe is fuel transferring pipe.

20. The wave absorbing structure for a fuel tank according to claim 1, wherein the pipe and the through hole are coaxially aligned.

* * * * *